US012643544B2

(12) United States Patent
Dobkowitz et al.

(10) Patent No.: US 12,643,544 B2
(45) Date of Patent: Jun. 2, 2026

(54) METHOD FOR THE LONGITUDINAL GUIDANCE OF A VEHICLE IN RELATION TO A LEADING VEHICLE DRIVING IN FRONT BY USING AN ELECTRONIC DISTANCE-KEEPING SYSTEM, AND DISTANCE- KEEPING SYSTEM FOR A VEHICLE

(71) Applicant: Volkswagen Aktiengesellschaft, Wolfsburg (DE)

(72) Inventors: Dirk Dobkowitz, Braunschweig (DE); Jonas Kaste, Braunschweig (DE); Felix Kallmeyer, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 35 days.

(21) Appl. No.: 18/941,487

(22) Filed: Nov. 8, 2024

(65) Prior Publication Data

US 2025/0145157 A1    May 8, 2025

(30) Foreign Application Priority Data

Nov. 8, 2023    (DE) ...................... 10 2023 211 070.9

(51) Int. Cl.
| | |
|---|---|
| *B60W 30/16* | (2020.01) |
| *B60W 40/09* | (2012.01) |
| *B60W 50/00* | (2006.01) |

(52) U.S. Cl.
CPC ............ *B60W 30/16* (2013.01); *B60W 40/09* (2013.01); *B60W 50/0097* (2013.01);
(Continued)

(58) Field of Classification Search
CPC ...... B60K 28/00–165; B60K 2028/003; B60K 2028/006; B60W 30/16; B60W 40/09;
(Continued)

(56) References Cited

U.S. PATENT DOCUMENTS

| | | | |
|---|---|---|---|
| 10,864,911 B2 * | 12/2020 | Jurca ...................... | G06V 20/56 |
| 2002/0069010 A1 | 6/2002 | Nishira et al. | |

(Continued)

FOREIGN PATENT DOCUMENTS

| | | |
|---|---|---|
| DE | 102005026065 A1 | 12/2006 |
| DE | 102018004027 A1 | 11/2018 |

(Continued)

*Primary Examiner* — Mark L. Greene
(74) *Attorney, Agent, or Firm* — Laurence A. Greenberg; Werner H. Stemer; Ralph E. Locher

(57) ABSTRACT

A method for longitudinal guidance of a vehicle relative to a leading vehicle driving in front by using an electronic distance-keeping system, includes providing an environmental parameter relating to an environment of the vehicle, providing a target distance at which the vehicle is intended to follow the leading vehicle, providing acceleration and/or braking information relating to the leading vehicle, assigning the leading vehicle to one of at least two different, predefined driving behavior classes based on the environmental parameter and the acceleration and/or braking information, and determining an at least temporarily permitted deviation from the target distance based on the assigned driving behavior class. The distance-keeping system is used to at least temporarily longitudinally guide the vehicle as following the leading vehicle based on the target distance and the permitted deviation. A distance-keeping system for a vehicle is also provided.

10 Claims, 3 Drawing Sheets

First Capture Unit
Second Capture Unit
Evaluation System
Evaluation Unit

(52) U.S. Cl.
CPC ..... *B60W 2552/00* (2020.02); *B60W 2552/30*
(2020.02); *B60W 2554/4046* (2020.02); *B60W*
*2554/406* (2020.02); *B60W 2554/802*
(2020.02); *B60W 2555/60* (2020.02); *B60W*
*2754/30* (2020.02)

(58) Field of Classification Search
CPC ... B60W 50/0097; B60W 2552/00–53; B60W
2554/00; B60W 2554/4046; B60W
2554/406; B60W 2554/802; B60W
2555/60; B60W 2754/30; G05D 1/0061;
G05D 1/0088; G05D 1/021; G05D
1/0214; G05D 1/0221; G05D 1/0223
See application file for complete search history.

(56) References Cited

U.S. PATENT DOCUMENTS

| | | | |
|---|---|---|---|
| 2006/0229793 | A1 | 10/2006 | Sawamoto et al. |
| 2009/0276135 | A1 | 11/2009 | Hagemann et al. |
| 2022/0258736 | A1 | 8/2022 | Limbacher |

FOREIGN PATENT DOCUMENTS

| | | | |
|---|---|---|---|
| DE | 102017119317 | A1 | 2/2019 |
| DE | 102019008894 | A1 | 8/2020 |
| DE | 102020215926 | A1 | 6/2022 |
| DE | 102011002275 | B4 | 8/2023 |

* cited by examiner

First Capture Unit

Second Capture Unit

Evaluation System

Evaluation Unit

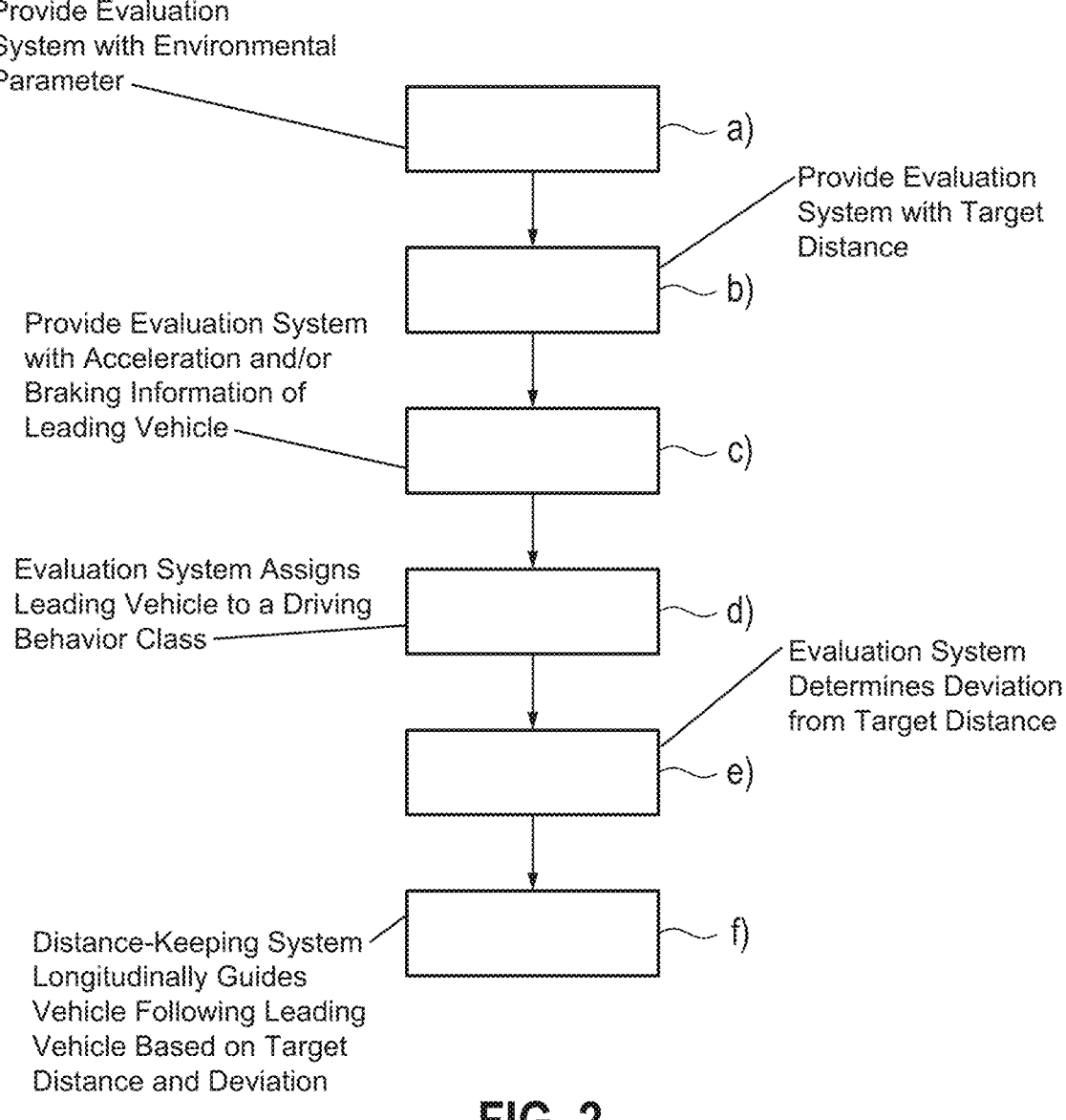

Provide Evaluation
System with Environmental
Parameter a)

Provide Evaluation
System with Target
Distance b)

Provide Evaluation System
with Acceleration and/or
Braking Information of
Leading Vehicle c)

Evaluation System Assigns
Leading Vehicle to a Driving
Behavior Class d)

Evaluation System
Determines Deviation
from Target Distance e)

Distance-Keeping System
Longitudinally Guides
Vehicle Following Leading
Vehicle Based on Target
Distance and Deviation f)

FIG. 2

METHOD FOR THE LONGITUDINAL GUIDANCE OF A VEHICLE IN RELATION TO A LEADING VEHICLE DRIVING IN FRONT BY USING AN ELECTRONIC DISTANCE-KEEPING SYSTEM, AND DISTANCE- KEEPING SYSTEM FOR A VEHICLE

CROSS-REFERENCE TO RELATED APPLICATION

This application claims the priority, under 35 U.S.C. § 119, of German Patent Application DE 10 2023 211 070.9, filed Nov. 8, 2023; the prior application is herewith incorporated by reference in its entirety.

FIELD AND BACKGROUND OF THE INVENTION

One aspect of the invention relates to a method for the longitudinal guidance of a vehicle in relation to a leading vehicle driving in front by using an electronic distance-keeping system. A further aspect of the invention relates to a distance-keeping system for a vehicle.

Electronic distance-keeping systems for controlling a distance to a vehicle driving in front are known and are generally referred to as Adaptive Cruise Control (ACC) systems. A distance to a leading vehicle driving in front that needs to be controlled is often determined by a momentary speed of the vehicle. In addition, a driver of the vehicle may have the option of varying the distance in stages.

An adaptive speed controller with situation-dependent dynamic adjustment is known from German Patent Application DE 10 2005 026 065 A1, corresponding to U.S. Publication No. 2009/0276135 A1.

The disadvantage of the known methods and systems for longitudinal guidance is that, due to firmly predefined target distances which must be complied with when the vehicle is following a vehicle driving in front, uncomfortable driving maneuvers can arise and thereby also traffic disruptions, in particular also with regard to a homogeneous traffic flow. Especially when the leading vehicle makes many and/or strong decelerations and accelerations, they are then carried out almost immediately by the following vehicle. That can also lead to uneconomical driving maneuvers which result in increased energy consumption, of fuel and/or electrical energy, of the following vehicle.

SUMMARY OF THE INVENTION

It is accordingly an object of the invention to provide a method for the longitudinal guidance of a vehicle in relation to a leading vehicle driving in front by using an electronic distance-keeping system, and a distance-keeping system for a vehicle, which overcome the hereinafore-mentioned disadvantages of the heretofore-known methods and systems of this general type and which improve the longitudinal guidance of the vehicle.

The object is achieved by the subjects of the independent claims. Advantageous developments of the invention are defined by the dependent claims, the following description and figures.

With the foregoing and other objects in view there is provided, in accordance with one aspect of the invention, a method for the longitudinal guidance of a vehicle in relation to a leading vehicle driving in front by using an electronic distance-keeping system. In particular, the method has the following steps:

a) providing, in particular, an evaluation system with at least one environmental parameter relating to an environment of the vehicle;

b) providing, in particular, the evaluation system with a target distance at which the vehicle is intended to follow the leading vehicle;

c) providing, in particular, the evaluation system with acceleration and/or braking information relating to the leading vehicle driving in front of the vehicle;

d) using the evaluation system to assign, in particular, the leading vehicle to one of at least two different, predefined driving behavior classes on the basis of the environmental parameter and the acceleration and/or braking information;

e) using the evaluation system to determine, in particular, an at least temporarily permitted deviation from the target distance provided on the basis of the assigned driving behavior class of the leading vehicle; and f) using the distance-keeping system to at least temporarily longitudinally guide the vehicle, in particular, to follow the leading vehicle on the basis of the target distance and the permitted deviation being determined.

This method allows proactive longitudinal guidance of the vehicle. This increases driving comfort. In particular, the method reduces jerky accelerations and/or decelerations of the vehicle. The situation is thus achieved in which, when the longitudinal guidance assistance system, in particular a distance-keeping system, of the vehicle is activated, the vehicle does not follow stubbornly on the basis of a firmly predefined target distance which should be complied with in the best possible way with respect to the leading vehicle. Rather, the method enables a temporary dynamic change. Provision is therefore deliberately and intentionally made for this target distance to be deliberately adapted. It is therefore possible to couple the vehicle to the leading vehicle during longitudinal guidance, but nevertheless a certain decoupling can be made possible in order to be able to perform a driving maneuver of the vehicle with respect to the leading vehicle, the driving maneuver deviating within tolerances, in particular with regard to deceleration and/or acceleration. This means that, even in the case of jerky and therefore very inhomogeneous driving of the leading vehicle for example, comparatively more homogeneous following of the vehicle can be carried out. Nevertheless, following is then also safe. In particular, the method also allows more comfortable driving of the following vehicle. The method advantageously also achieves the situation in which, when the leading vehicle is being driven in a manner which is more inefficient in terms of energy consumption, more efficient driving of the vehicle or the following vehicle is made possible.

An environmental parameter is, for example, a speed limit, and/or a road course, for example a straight line or a bend, in particular a bend curvature, and/or a traffic volume in an environment of the leading vehicle, and/or a type of road, for example urban, extra-urban, highway, expressway or freeway. In particular, a plurality of environmental parameters, especially those listed here, are provided.

In particular, the environmental parameter is captured by using at least one capture unit of a capture system. In particular, the vehicle has the at least one capture unit. It is also possible for parts of the capture system to be external to the vehicle. In particular, a plurality of environmental parameters are captured, in particular using a plurality of capture units of the capture system. The acceleration and/or braking information is captured in particular using at least one further capture unit of the capture system.

The target distance is in particular a target distance between the vehicle, which has the electronic distance-keeping system, and a vehicle currently driving in front that is to be set during operation of the electronic distance-keeping system. The target distance can be a distance. Alternatively, the target distance can also be or characterize, for example, a time specification, for example a time gap. In particular, the time gap is a period of time required by the vehicle to reach the leading vehicle.

In particular, the deviation is determined in such a way that a minimum safety distance to the leading vehicle is not undershot.

In order to assign the leading vehicle to one of the at least two different driving behavior classes, the acceleration and/or braking information linked, in particular locally and/or temporally, to the environmental parameter is analyzed, in particular. In particular, this linking characterizes a driving behavior. As a result, the leading vehicle is better assigned to the driving behavior class that corresponds to the actual driving behavior of the leading vehicle.

At least two different driving behavior classes are predefined. With only two driving behavior classes, the method is carried out more quickly and with reduced computational effort. For example, a first of the at least two driving behavior classes represents a proactive, homogeneous driving behavior of the leading vehicle. For example, a second of the at least two driving behavior classes represents a jerky, inhomogeneous driving behavior of the leading vehicle. In particular, even further driving behavior classes which subdivide these extremes are possible. For example, further driving behavior classes represent the following driving behaviors of the leading vehicle: unpredictable, jerky, nervous, confident, smooth. The deviation is determined more precisely on the basis of the further driving behavior classes.

In particular, each of the at least two driving behavior classes is assigned a maximum deviation from the target distance provided. For example, the maximum deviation assigned to the first driving behavior class is less than the maximum deviation assigned to the second driving behavior class. Thus, for example, an actual distance between the vehicle and the leading vehicle is less varied in the case of a homogeneous driving behavior of the leading vehicle than in the case of a leading vehicle with an inhomogeneous driving behavior. As a result, the decoupling from the leading vehicle is effected only as far as is necessary to increase the driving comfort and reduce an energy consumption of the vehicle.

At least some steps of the method can be performed in a swapped manner in terms of time or in an at least partially overlapping manner with respect to a sequence.

In particular, an inhomogeneous driving behavior of the leading vehicle is compensated for by the temporary deviation from the target distance provided, so that this is not transferred to the vehicle.

In one exemplary embodiment, at least one of the following variables is taken into account as acceleration and/or braking information:

a number of changes in acceleration and/or braking operations of the leading vehicle in a time interval, a strength of the acceleration and/or braking during a braking operation and/or acceleration operation of the leading vehicle, a time difference between acceleration and/or braking operations of the leading vehicle, a ratio of a duration of an acceleration operation to a duration of a braking operation of the leading vehicle.

In particular, at least one of these variables is captured as acceleration and/or braking information using the capture system and is stored in a storage unit of the evaluation system. These variables can be captured easily, quickly and reliably. Furthermore, these variables characterize the driving behavior of the leading vehicle, in particular in conjunction with the environmental parameter.

During the analysis, the evaluation system also preferably and generally assesses whether this at least one acceleration operation and/or this at least one braking operation of the leading vehicle would have been required and/or the strength with which and/or the respective duration for which it would have been required. In particular, the environmental parameters are also taken into account for this assessment. This is because, if the analysis reveals that the acceleration and/or braking was required and thus correct due to the overall situation, in particular also the traffic situation, steps e) and f), in particular steps d), e) and f), cannot be carried out in one exemplary embodiment. However, if it is recognized that this would not have been required, steps e) and f), in particular steps d), e) and f), are carried out in one exemplary embodiment. In one exemplary embodiment, this above-mentioned assessment may also be omitted.

In one exemplary embodiment, the acceleration and/or braking information and/or the environmental parameter is/are captured and/or evaluated in an analysis in a time interval, which can also be referred to as an analysis time interval, wherein in particular the analysis time interval is selected to be so long that sufficient acceleration and/or braking information and/or the environmental parameter is/are captured in order to assign the leading vehicle to one of the at least two driving behavior classes.

This means that the driving behavior of the leading vehicle is initially observed in order to be able to decide, in particular by way of the evaluation system, whether steps e) and f), in particular steps d, e) and f), should be carried out. The analysis time interval can be firmly predefined. It may be firmly predefined, for example, on the basis of the current environment of the vehicles and/or the type of road on which the vehicles are moving and/or the current traffic density and/or the type of leading vehicle and/or the type of vehicle. However, it is also possible for the analysis time interval to be dynamically changed. This may also depend on at least some of the above-mentioned parameters, in particular their change, if this is possible. A dynamic change may also depend on the above-mentioned acceleration and/or braking information itself.

Such an analysis can be carried out once or preferably several times during following. This also makes it possible to react to a changed driving behavior of the leading vehicle during following. An analysis can take at least a few seconds, for example at least 10 seconds, in particular at least 30 seconds.

In one exemplary embodiment, the vehicle is guided longitudinally on the basis of the determined deviation by setting dynamic parameters of the electronic distance-keeping system.

The dynamic parameters of the electronic distance-keeping system that are to be set are, for example, a maximum permissible target acceleration and/or a maximum longitudinal jerk and/or a maximum acceleration duration and/or a maximum permissible penetration depth and/or a minimum planning horizon. In particular, the determined deviation results, in a defined and intentional manner, from the set dynamic parameters. This reduces jerky braking or acceleration of the vehicle.

For example, the maximum permissible target acceleration indicates how strongly the vehicle is braked or accelerated when the leading vehicle brakes or accelerates. If, for example, the leading vehicle accelerates more strongly than predefined by the set maximum permissible target acceleration of the vehicle, the determined deviation is increased. If, for example, the leading vehicle then reduces its acceleration to a value below the target acceleration, the vehicle catches up again, for example, to the predefined target distance from the leading vehicle.

The longitudinal jerk predefines, in particular, how quickly the acceleration and/or deceleration strength is maximally changed. In particular, the maximum permissible target acceleration and the maximum longitudinal jerk predefine how quickly the electronic distance-keeping system reacts to a change in distance to the leading vehicle. The minimum planning horizon predefines, for example, what route length is taken into account in advance in travel planning.

If, for example, the leading vehicle is assigned to a driving behavior class of the at least two driving behavior classes which predominantly corresponds to a homogeneous, proactive driving behavior, the maximum permissible target acceleration and/or the maximum permissible longitudinal jerk, for example, is/are set to be greater than in the case of a leading vehicle which is assigned to the driving behavior class which corresponds to an inhomogeneous driving behavior. For example, the minimum planning horizon is reduced in the case of a homogeneous driving behavior of the leading vehicle and is increased in the case of an inhomogeneous driving behavior of the leading vehicle.

This compensates for an inhomogeneous driving behavior of the leading vehicle. In the case of a homogeneous driving behavior of the leading vehicle, the target distance is kept virtually constant, for example. In particular, a remaining residual deviation from the target distance is unintended in this case.

In one exemplary embodiment, the leading vehicle is assigned to one of the at least two driving behavior classes after a time interval, in particular a specified time interval, and/or after a predefined frequency for an occurrence of the environmental parameter. The time interval can be the above-mentioned analysis time interval.

For example, the assignment is checked and/or reassigned after the specified time interval. For example, the specified time interval is between 20 seconds and 80 seconds, in particular between 30 seconds and 60 seconds. For example, the frequency for the occurrence of the environmental parameter is between 3 and 15, in particular between 8 and 12, in particular 10. For example, the assignment takes place after the speed limit has changed ten times. In particular, the leading vehicle is initially assigned to the homogeneous driving behavior class at the start of following.

This exemplary embodiment allows an improved assignment of the leading vehicle to a driving behavior class.

In one exemplary embodiment, the assignment in step d) is carried out on the basis of an exceedance frequency of predefined limit values for values of the acceleration and/or braking information for a predefined environmental parameter. This means that the assignment can be carried out with a reduced computational effort for the evaluation system.

For example, the exceedance frequency is a relative frequency. For example, ten speed limit changes are analyzed. If in one example the leading vehicle reacts to the change in the speed limit more than twice, in particular more than three times, in particular more than five times, with strong acceleration and/or braking, then the leading vehicle is assigned, for example, to the driving behavior class which corresponds to an inhomogeneous driving behavior. For example, strong braking and/or acceleration means a positive or negative acceleration of more than 2 m/s$^2$, in particular more than 3 m/s$^2$.

In one exemplary embodiment, the evaluation system is provided with a route parameter. The deviation is determined on the basis of the route parameter.

The route parameter is in particular a category of road, for example a freeway or highway or local road. It is possible for the route parameter to correspond to and/or depend on the environmental parameter. In particular, the route parameter is captured using the capture system. It is also possible for the route parameter to correspond to a frequency of the environmental parameter within a predefined time period.

For example, depending on the route parameter, it is determined whether the dynamic parameters are set according to the assigned class or whether a default setting is made for the dynamic parameters. If, for example, the "freeway" road category is provided as a route parameter, it is possible for the default setting to be made for the dynamic parameters. For example, the default setting of the dynamic parameters corresponds to the same setting of the dynamic parameters assigned to the driving behavior class that corresponds to a homogeneous driving behavior of the vehicle. In this example, this reduces the likelihood of other automobiles pushing into the distance due to sluggish adherence to the target distance. This problem does not usually appear on highways, but, with frequent changes in the speed limit and/or bends, an inhomogeneous driving behavior of the leading vehicle has increased effects on the vehicle. Therefore, it is advantageous, for example in the case of a route parameter which corresponds to a frequent occurrence of the environmental parameters "bends" and/or "speed limit" in temporal succession, if the dynamic parameters are set according to the assigned class.

In one exemplary embodiment, the evaluation system is used to predict a value for the acceleration and/or braking information of the leading vehicle for a provided environmental parameter. The deviation is determined in step f) on the basis of this prediction.

For example, the vehicle increases the distance from the leading vehicle in comparison with the target distance even before the leading vehicle brakes heavily. This is done, for example, when a bend and/or a lower speed limit than the previously applicable speed limit is/are provided as an environmental parameter. In particular, the environmental parameter is still ahead of a route to be driven by the leading vehicle in terms of time and location. If, for example, the leading vehicle is assigned to the inhomogeneous driving behavior class, a high value for the negative acceleration of an expected braking operation is predicted in this situation. This further increases the driving comfort.

In one exemplary embodiment, it is checked whether a current leading vehicle is identical to the previously followed leading vehicle. In particular, this prevents an outdated assignment of the leading vehicle from being used as the basis for determining the deviation.

In one exemplary embodiment, an assignment rule for assigning one of the driving behavior classes of the at least two driving behavior classes is adapted on the basis of an acceleration of the vehicle.

The assignment rule includes, for example, the exceedance frequency and/or predefined limit values for values of the acceleration and/or braking information. The assignment rule is adapted in particular on the basis of a driving behavior of the vehicle that is characterized by the vehicle's acceleration. If, for example, an inhomogeneous driving behavior of the leading vehicle is transferred to the vehicle, the assignment rule is changed, for example, in such a way that the leading vehicle is assigned to the driving behavior class which corresponds to an inhomogeneous driving behavior. If this is already the case, for example, a larger deviation is determined for this driving behavior class, for example; in particular, the dynamic parameters are adapted, for example.

This exemplary embodiment makes it possible to further improve the assignment of the leading vehicle to one of the at least two driving behavior classes and/or the determination of the deviation. This further increases the driving comfort.

In one exemplary embodiment, the target distance is determined on the basis of an adaptation data set. The adaptation data set is generated in particular according to the following method steps:

carrying out a first reference journey with a first fleet vehicle in a vehicle fleet having at least two fleet vehicles;

capturing at least one first influencing variable and a first distance from the first fleet vehicle to a leading vehicle driving in front during the first reference journey;

carrying out a second reference journey by a second fleet vehicle in the vehicle fleet;

capturing at least one second influencing variable and a second distance from the second fleet vehicle to a further leading vehicle driving in front during the second reference journey;

determining the adaptation data set on the basis of the first influencing variable and the second influencing variable and the first distance and the second distance.

For example, the electronic distance-keeping system can be operated with the adaptation data set generated in this way. In other words, the method generates an adaptation data set that can be used to set a distance between the vehicle and a leading vehicle driving in front in a dynamic and situation-specific manner on the basis of the target parameter.

It is advantageous if a multiplicity of reference journeys are carried out. In particular, a multiplicity of measured values of the influencing variables are respectively captured during the reference journeys. The more reference journeys are carried out, the more different influencing variables and the more measured values of the respective influencing variables are captured, the more meaningfully and distinctively the adaptation data set can be determined.

For example, the first and/or second influencing variable is at least one of the following variables: The speed of the respective fleet vehicle and/or of the leading vehicle driving in front in each case, a change in the speed of the respective fleet vehicle and/or of the leading vehicle driving in front in each case, a weather situation, a traffic density, a temperature, a set driving profile of the fleet vehicle, a vehicle type of the fleet vehicle and/or of the leading vehicle, a time of day and/or a brightness, and/or a season, a road category, a technology concept of a drive system of the fleet vehicle, a type of driver of the fleet vehicle and/or of the leading vehicle, a used lane of a road, an operating state of a distance-keeping system of at least the fleet vehicle, a road friction coefficient, a speed limit, a road condition, a distance to a following vehicle driving behind. For example, the listed variables can also be referred to as the type of influencing variable or as labels or descriptors.

The captured influencing variables and distances of the reference journeys can be referred to as fleet data.

With the objects of the invention in view, there is concomitantly provided a further aspect of the invention which relates to an electronic distance-keeping system for a vehicle with an evaluation system, wherein the distance-keeping system is configured to carry out the method according to the invention.

Exemplary embodiments, advantages and features of the method according to the invention are exemplary embodiments, advantages and features of the distance-keeping system according to the invention.

The invention also includes the combinations of the features of the embodiments described.

Other features which are considered as characteristic for the invention are set forth in the appended claims.

Although the invention is illustrated and described herein as embodied in a method for the longitudinal guidance of a vehicle in relation to a leading vehicle driving in front by using an electronic distance-keeping system, and a distance-keeping system for a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIG. 2 is a flowchart of an exemplary embodiment of the method according to the invention.

DETAILED DESCRIPTION OF THE
INVENTION

The exemplary embodiments explained below are preferred exemplary embodiments of the invention. In the exemplary embodiments, the components described each represent individual features of the invention which can be considered independently of each other, each also develop the invention independently of each other and can therefore also be regarded, individually or in a combination other than the one shown, as a component part of the invention. Furthermore, the exemplary embodiments described can also be supplemented with further features of the already described features of the invention.

Figure 1:
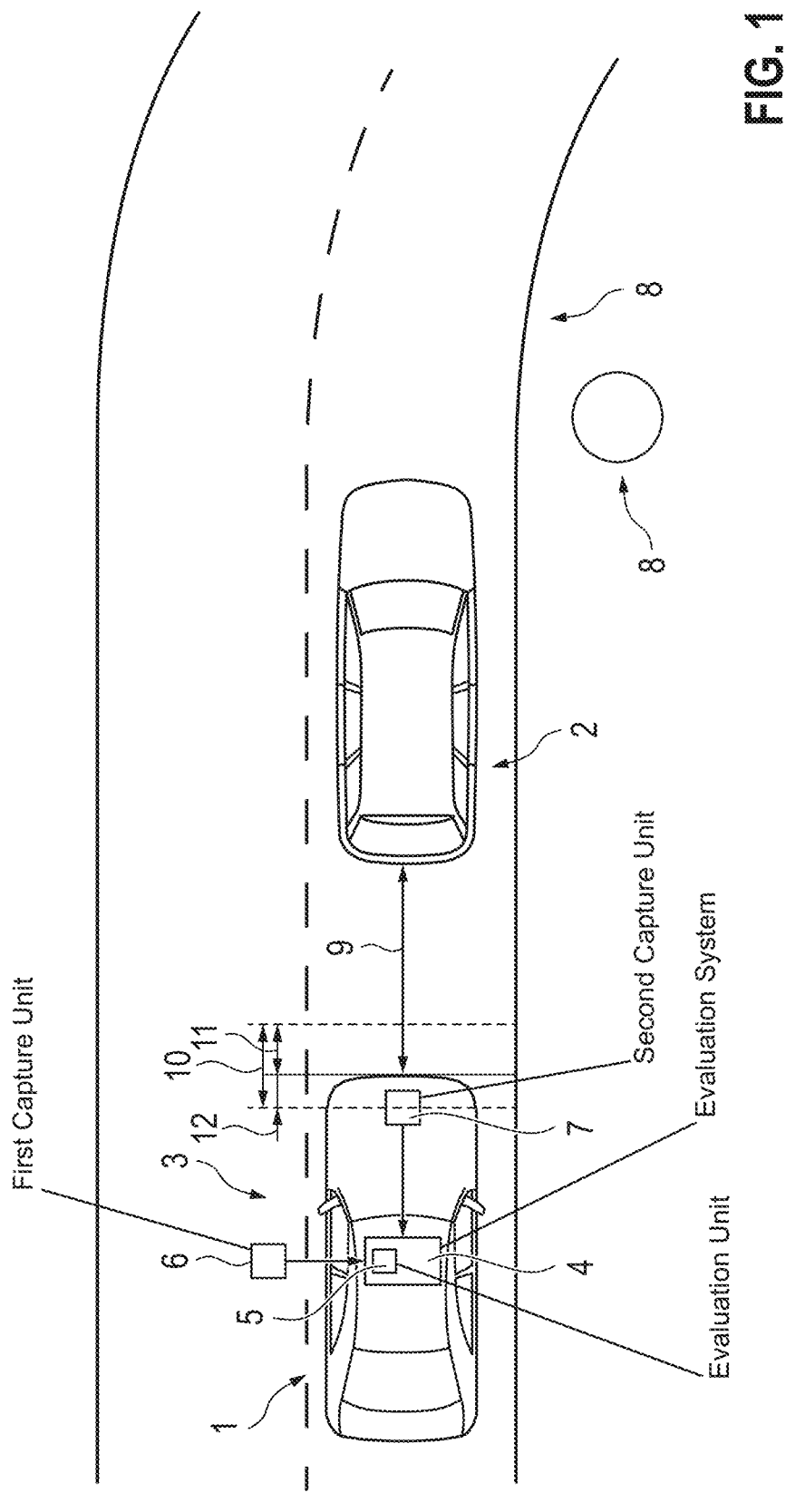
FIG. 1 is a diagrammatic, top-plan view of an exemplary situation in which an exemplary embodiment of a method according to the invention for the longitudinal guidance of a vehicle in relation to a leading vehicle driving in front is carried out with an exemplary embodiment of an activated electronic distance-keeping system according to the invention.

Referring now in detail to the figures of the drawings, in which functionally identical elements are each provided with the same reference signs, and first, particularly, to FIG. 1 thereof, there is seen an exemplary situation in which an exemplary embodiment of a method for the longitudinal guidance of a vehicle 1 in relation to a leading vehicle 2 driving in front is carried out with an exemplary embodiment of an electronic distance-keeping system 3. The distance-keeping system 3 has an evaluation system 4, in particular having an evaluation unit 5. The distance-keeping system 3 may have in particular a capture system, for example having a first capture unit 6 and a second capture unit 7. In particular, the distance-keeping system 3 is configured to carry out an exemplary embodiment of the method for the longitudinal guidance of the vehicle 1.

FIG. 2 shows a flowchart of an exemplary embodiment of the method for the longitudinal guidance of the vehicle 1.

For this purpose, in a step a), the evaluation system 4 is provided with at least one environmental parameter 8 relating to an environment of the vehicle 1. The environmental parameter 8 is for example a bend curvature and/or a speed limit. In one exemplary embodiment, the environmental parameter 8 is captured at least using the first capture unit 6. The first capture unit 6 is configured for this purpose, for example, as a camera and/or as a communication interface for receiving map data. In particular, the capture system determines the environmental parameter from captured camera images or camera signals and/or map data and makes it available to the evaluation system 4. For example, a bend radius of a route to be driven can be provided as a bend curvature.

In the situation shown in FIG. 1, for example, the first capture unit 6 captures a speed limit and a bend curvature as environmental parameters 8 and makes them available to the evaluation system 4.

In a step b), the evaluation system 4 is provided with a target distance 9 at which the vehicle 1 is intended to follow the leading vehicle 2. In particular, the evaluation system 4 has a distance computing unit, such as an electronic circuit and/or a processor, which determines the target distance 9.

In a step c), the evaluation system 4 is provided with acceleration and/or braking information relating to the leading vehicle 2 driving in front of the vehicle 1. For example, for this purpose, the second capture unit 7 captures, for example, a strength of the acceleration and/or braking of the leading vehicle 2 and makes this available to the evaluation system 4 as acceleration and/or braking information. This is preferably carried out during at least one analysis, in particular in at least one analysis time interval, in which the driving behavior of the leading vehicle 2 is analyzed. For example, a duration of the acceleration and/or deceleration operation is also made available to the evaluation system 4 as acceleration and/or braking information.

During the analysis, the evaluation system 4 also preferably and generally assesses whether this at least one acceleration operation and/or this at least one braking operation of the leading vehicle 2 would have been required and/or the strength with which and/or the respective duration for which it would have been required. In particular, the environmental parameters are also taken into account for this assessment. This is because, if the analysis reveals that the acceleration and/or braking was required and thus correct due to the overall situation, in particular also the traffic situation, steps e) and f) cannot be carried out in one exemplary embodiment. However, if it is recognized that this would not have been required, steps e) and f) are carried out in one exemplary embodiment. In one exemplary embodiment, this above-mentioned assessment may also be omitted.

For example, in the situation shown in FIG. 1, the second capture unit 7 captures braking of the leading vehicle 2 with a strength of, for example, more than 2 m/s$^2$, in particular more than 3 m/s$^2$, for example for more than 1 second, in particular more than 4 seconds. This is then made available to the evaluation system 4 in particular as acceleration and/or braking information.

In a step d), the evaluation system 4 is used to assign the leading vehicle 2 to one of at least two different, predefined driving behavior classes on the basis of the environmental parameter 8 and the acceleration and/or braking information. For example, two different driving behavior classes are predefined. For example, a first driving behavior class of the two driving behavior classes represents a homogeneous proactive driving behavior of the leading vehicle 2. For example, a second driving behavior class of the two driving behavior classes represents an inhomogeneous driving behavior of the leading vehicle 2.

In the example explained with regard to FIG. 1, the leading vehicle 2 is assigned, for example, to the second driving behavior class, since the brief strong braking, in particular shortly before the speed limit or bend, represents an inhomogeneous driving behavior.

In a step e), the evaluation system 4 is used to determine an at least temporarily permitted deviation 10 from the target distance 9 provided on the basis of the assigned driving behavior class of the leading vehicle 2.

In a step f), the distance-keeping system 3 is used to at least temporarily longitudinally guide the vehicle 1 as following the leading vehicle on the basis of the target distance 9 and the permitted deviation 10 determined. In particular, dynamic parameters of the electronic distance-keeping system 3 are set for this purpose. Setting is carried out in particular on the basis of the assigned driving behavior class. For example, a maximum permissible target acceleration and/or a maximum permissible penetration depth 11 is/are set as dynamic parameters.

For example, in the example explained with respect to FIG. 1, the deviation set is that the target distance 9 is reduced by a penetration depth 11. This means in particular that the vehicle 1 reduces an actual distance compared to the target distance 9 by the penetration depth 11 and therefore decelerates less strongly than the leading vehicle 2. In addition, it is possible that, due to acceleration and/or braking information and thus a temporally or locally linked environmental parameter 8 of a previous journey behind the same leading vehicle 2, the evaluation system 4 predicts the strong braking of the leading vehicle 2 for the present environmental parameter 8. In this case, it is possible for a buffer distance 12 to be determined as part of the deviation 10. For example, in this case, the actual distance is already increased in comparison with the target distance 9 by the buffer distance 12 before the expected strong braking of the leading vehicle 2.

Figure 3:
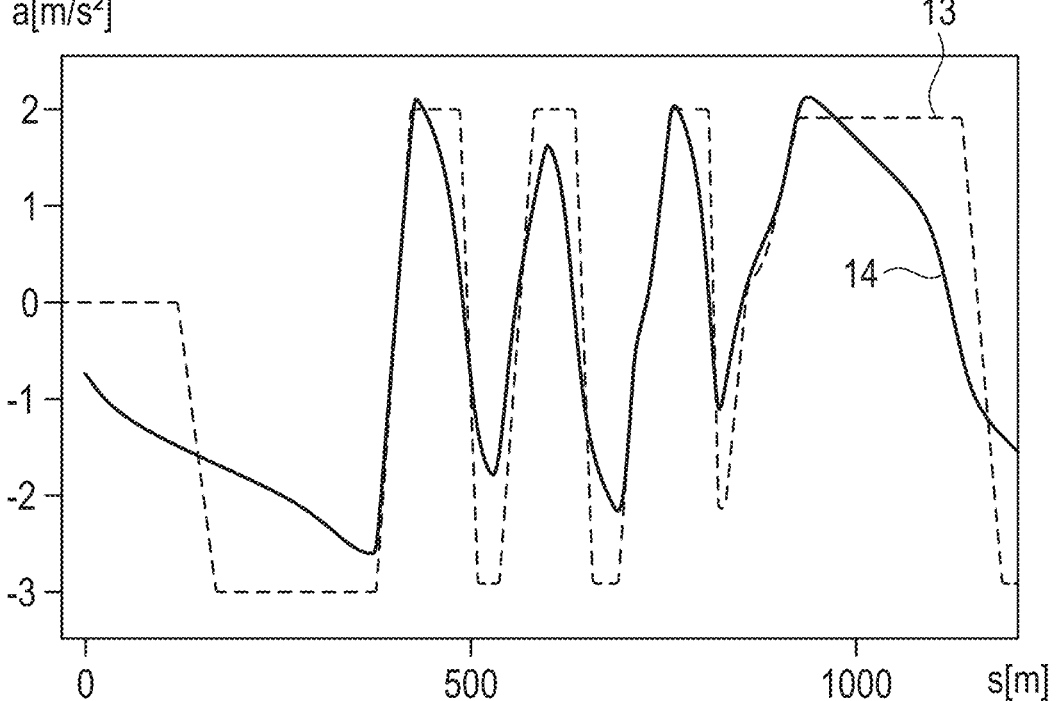
FIG. 3 is an exemplary resulting acceleration diagram of the vehicle and of the leading vehicle when performing an exemplary embodiment of the method according to the invention.

FIG. 3 shows an exemplary resulting acceleration diagram of the vehicle 1 and of the leading vehicle 2 when performing an exemplary embodiment of the method for the longitudinal guidance of the vehicle 1. The first acceleration profile 13 of the leading vehicle 2 shows in FIG. 3 the strength of the acceleration or the braking over a temporal or local profile. In this exemplary profile, the leading vehicle 2 decelerates strongly, for example up to −3 m/s$^2$, and it also accelerates strongly up to 2 m/s$^2$. This driving behavior is uncomfortable for an occupant, for example, and can lead in particular to an increased energy consumption of the vehicle. The first acceleration profile 13 of the leading vehicle 2 characterizes an inhomogeneous driving behavior. The evaluation system 4 assigns the leading vehicle 2 with this acceleration profile 13 shown to the second driving behavior class, for example, which represents an inhomogeneous driving behavior. In particular, the second driving behavior class is assigned dynamic parameters of the distance-keeping system 3 which lead to a greater deviation 10 than the dynamic parameters assigned to the first driving behavior class. For example, the temporarily permissible deviation 10 compensates for the inhomogeneous driving behavior of the leading vehicle 2.

The second acceleration profile 14 of the vehicle 1 has lower acceleration and/or braking strengths. In particular, the maximum acceleration and/or braking strengths are maintained for a shorter time than in the first acceleration profile 13 of the leading vehicle 2. This achieves a more comfortable driving behavior of the vehicle 1.

The following is a summary list of reference numerals and the corresponding structure used in the above description of the invention:

1 Vehicle
2 Leading vehicle
3 Distance-keeping system
4 Evaluation system
5 Evaluation unit
6 First capture unit
7 Second capture unit
8 Environmental parameter
9 Target distance
10 Deviation
11 Penetration depth
12 Buffer distance
13 First acceleration profile
14 Second acceleration profile

The invention claimed is:

1. A method for longitudinal guidance of a vehicle in relation to a leading vehicle driving in front by using an electronic distance-keeping system, the method comprising steps of:

a) providing an evaluation system with at least one environmental parameter relating to an environment of the vehicle;

b) providing the evaluation system with a target distance at which the vehicle is intended to follow the leading vehicle;

c) providing the evaluation system with at least one of acceleration or braking information relating to the leading vehicle driving in front of the vehicle;

d) using the evaluation system to assign the leading vehicle to one of at least two different, predefined driving behavior classes based on the environmental parameter and the at least one of acceleration or braking information;

e) using the evaluation system to determine an at least temporarily permitted deviation from the provided target distance based on the assigned driving behavior class of the leading vehicle; and f) using the distance-keeping system to at least temporarily longitudinally guide the vehicle to follow the leading vehicle based on the target distance and the determined permitted deviation.

2. The method according to claim 1, which further comprises providing, as the at least one of acceleration or braking information, at least one of:

a number of changes in at least one of acceleration or braking operations in a time interval, or a strength of at least one of the acceleration or braking during at least one of a braking operation or acceleration operation, or a time difference between at least one of acceleration or braking operations, or a ratio of a duration of an acceleration operation to a duration of a braking operation.

3. The method according to claim 1, which further comprises guiding the vehicle longitudinally based on the determined deviation by setting dynamic parameters of the electronic distance-keeping system.

4. The method according to claim 1, which further comprises assigning the leading vehicle to one of the at least two driving behavior classes at least one of after a specified time interval or after a predefined frequency for an occurrence of the environmental parameter.

5. The method according to claim 1, which further comprises carrying out the assignment in step d) based on an exceedance frequency of predefined limit values for values of the at least one of acceleration or braking information for a predefined environmental parameter.

6. The method according to claim 1, which further comprises providing the evaluation system with a route parameter, and determining the deviation based on the route parameter.

7. The method according to claim 1, which further comprises using the evaluation system to predict a value for the at least one of acceleration or braking information of the leading vehicle for a provided environmental parameter, and determining the deviation in step e) based on the prediction.

8. The method according to claim 1, which further comprises checking whether or not a current leading vehicle is identical to a previously followed leading vehicle.

9. The method according to claim 1, which further comprises adapting an assignment rule for assigning one of the driving behavior classes of the at least two driving behavior classes, based on an acceleration of the vehicle.

10. A distance-keeping system for a vehicle, the distance-keeping system comprising:

an evaluation system configured to carry out the method according to claim 1.

* * * * *